US009706131B2

United States Patent
Kobayashi

(10) Patent No.: US 9,706,131 B2
(45) Date of Patent: Jul. 11, 2017

(54) IMAGE COMBINING APPARATUS FOR GENERATING A COMBINED IMAGE FROM A PLURALITY OF IMAGES, IMAGE COMBINING SYSTEM, AND IMAGE COMBINING METHOD

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/722,515

(22) Filed: May 27, 2015

(65) Prior Publication Data

US 2015/0358552 A1 Dec. 10, 2015

(30) Foreign Application Priority Data

Jun. 4, 2014 (JP) ................................. 2014-116102

(51) Int. Cl.
*H04N 5/228* (2006.01)
*H04N 5/235* (2006.01)
*H04N 5/355* (2011.01)

(52) U.S. Cl.
CPC ......... *H04N 5/2356* (2013.01); *H04N 5/2355* (2013.01); *H04N 5/35581* (2013.01)

(58) Field of Classification Search
CPC .................... H04N 5/2355; G06T 2207/20208
See application file for complete search history.

(56) References Cited

U.S. PATENT DOCUMENTS

2013/0136364 A1* 5/2013 Kobayashi ............. G06T 5/009
382/195

FOREIGN PATENT DOCUMENTS

JP 2008-277896 A 11/2008

* cited by examiner

*Primary Examiner* — Sinh Tran
*Assistant Examiner* — Selam Gebriel
(74) *Attorney, Agent, or Firm* — Cowan, Liebowitz & Latman, P.C.

(57) ABSTRACT

First, images are captured with three exposure levels, and pixel levels of a low exposure image and an intermediate exposure image are amplified to be matched to those of a high exposure image. Next, a brightness combining ratio for each image is calculated based on the low exposure image that has been matched in brightness. Then, images having brightness combining ratios that are not 0% in a region of interest are selected, and only the selected images are used to generate a combined image in the region of interest, and the low exposure image is used as a substitute, for example, in a region other than the region of interest.

17 Claims, 16 Drawing Sheets

FIG. 2
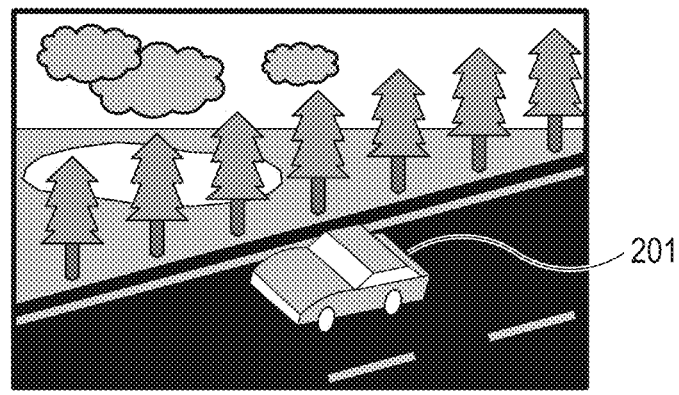
(a) LOW EXPOSURE IMAGE
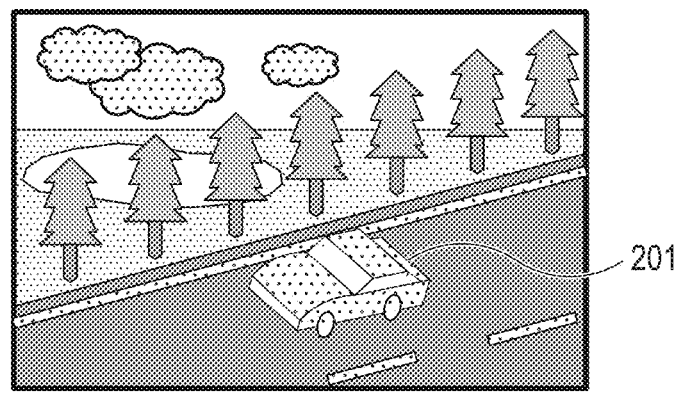
(b) INTERMEDIATE EXPOSURE IMAGE
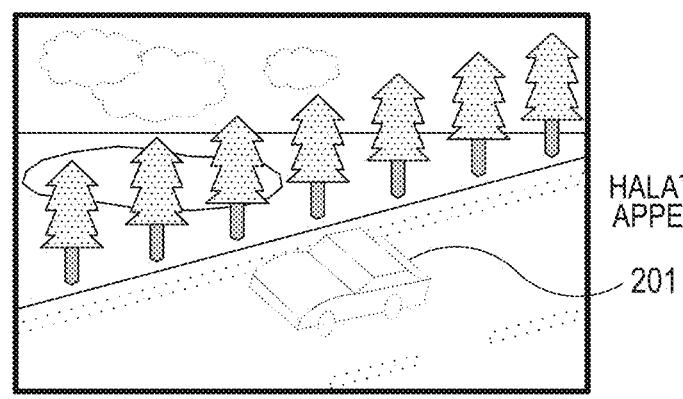
(c) HIGH EXPOSURE IMAGE FIG. 9
(a) LOW EXPOSURE IMAGE
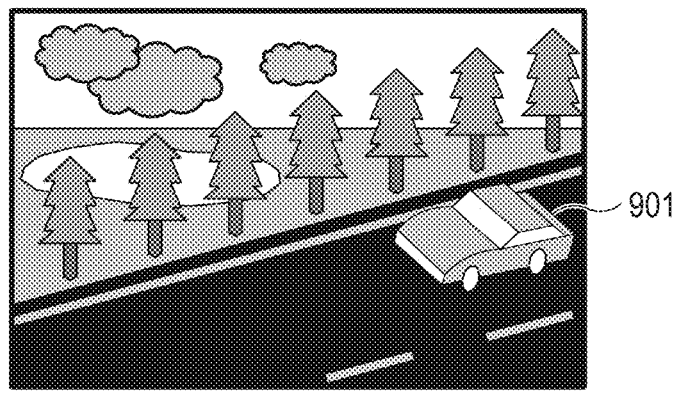
901
(b) INTERMEDIATE EXPOSURE IMAGE
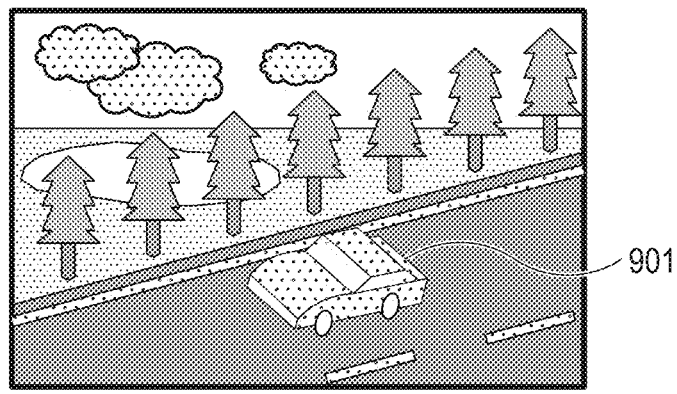
901
(c) HIGH EXPOSURE IMAGE
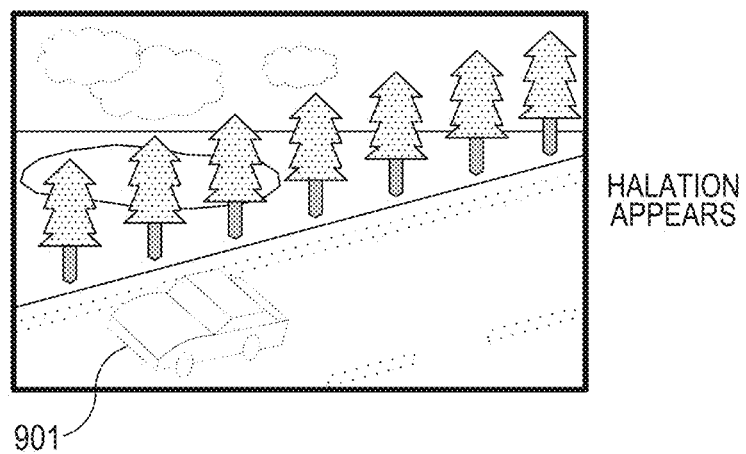
HALATION APPEARS
901

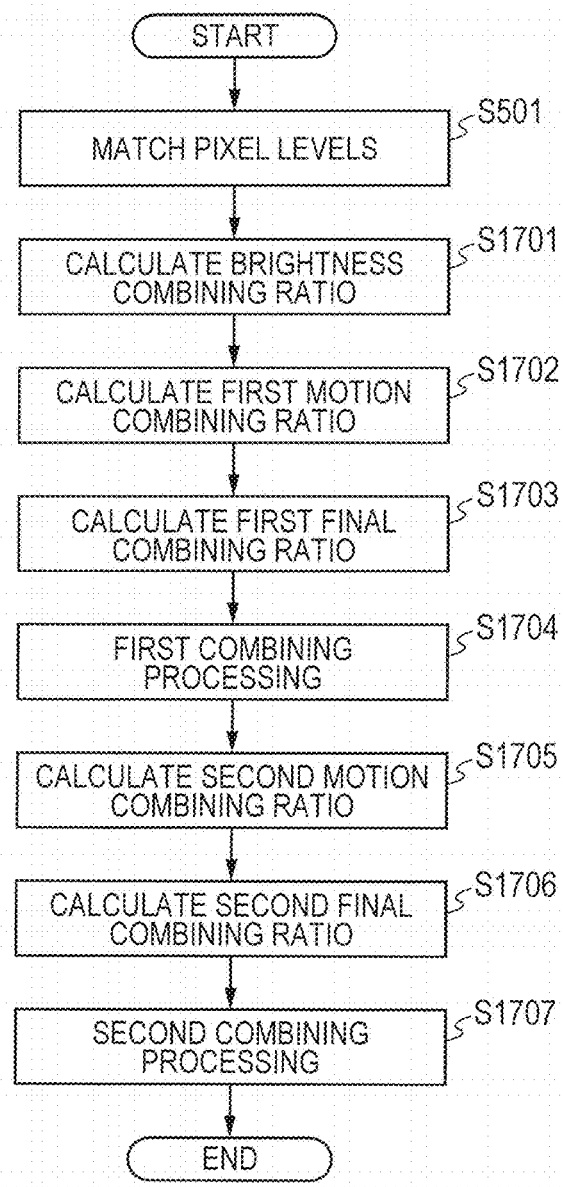

IMAGE COMBINING APPARATUS FOR GENERATING A COMBINED IMAGE FROM A PLURALITY OF IMAGES, IMAGE COMBINING SYSTEM, AND IMAGE COMBINING METHOD

BACKGROUND OF THE INVENTION

Field of the Invention

The present invention relates to an image combining apparatus, an image combining system, an image combining method, and a storage medium for a program, which are suitable for use for a high dynamic range function, in particular.

Description of the Related Art

In recent years, a number of digital cameras capable of combining a plurality of images and recording a combined image have been commercialized as image pickup apparatus. Of the image pickup apparatus, there have been known image pickup apparatus having a function of combining images captured at exposures that are lower and higher, respectively, than an exposure at which a brightness of a subject is appropriate to improve halation and noise in a dark part. Such function is referred to as "high dynamic range (HDR) function".

In general, a dynamic range of an image pickup element is narrower than a dynamic range in nature, and when an image is captured in a backlit scene, for example, the halation may appear. When an image is captured with a lower exposure, the captured image becomes dark as a whole, with the result that the halation may be suppressed, but an impression of noise in the dark part is increased. On the other hand, when an image is captured with a higher exposure, the captured image becomes bright as a whole, with the result that the halation appears, but the impression of noise in the dark part is improved. According to the HDR function, a plurality of images, such as a low exposure image and a high exposure image, may be used for combining with the low exposure image being weighted in a bright region (halation or the like) and, on the contrary, the high exposure image being weighted in a dark region to improve the halation and the impression of noise in the dark part.

Moreover, not only the above-mentioned two images: the low exposure image and the high exposure image, but also an image at a higher exposure and an image at a lower exposure may be used for combining to further improve the halation and noise. In other words, a larger number of images at different exposures may be combined to obtain a combined image having a higher dynamic range. In Japanese Patent Application Laid-Open No. 2008-277896, there is disclosed a technology in which the low exposure image and the high exposure image, which is selected from the plurality of high exposure images, are combined to obtain the combined image having the high dynamic range.

SUMMARY OF THE INVENTION

According to one embodiment of the present invention, there is provided an image combining apparatus, including: an imaging unit configured to image a subject with different photographic conditions to generate a plurality of images; a detecting unit configured to detect a region of interest including the subject from the plurality of images generated by the imaging unit; a calculation unit configured to calculate combining ratios for the plurality of images in the region of interest detected by the detecting unit; a selection unit configured to select images for use in image combining from among the plurality of images based on the combining ratios calculated by the calculation unit; and a combining unit configured to use the images selected by the selection unit to generate a combined image corresponding to regions including the region of interest and a region other than the region of interest.

Further features of the present invention will become apparent from the following description of exemplary embodiments with reference to the attached drawings.

BRIEF DESCRIPTION OF THE DRAWINGS

FIG. 2 is a diagram for illustrating examples of three images taken of a scene in which a subject of interest is stationary with different exposures.

FIG. 9 is a diagram for illustrating examples of three images taken of a scene in which a subject of interest is moving with different exposures.

FIG. 17 is a flow chart for illustrating an example of a main combining processing procedure in the third embodiment.

DESCRIPTION OF THE EMBODIMENTS

In general, in the HDR function described above, a plurality of images are generated to perform image processing, and hence an amount of processing is large. Moreover, in a case where the number of images for use in the combining is increased in order to obtain a combined image having a higher (wider) dynamic range, the amount of processing becomes still larger. Therefore, there has been a problem in that long processing time is required and the next photo opportunity is missed. On the other hand, in a case where the number of images for use in the combining is decreased to reduce the processing time, the dynamic range becomes low (narrow) and may cause halation around a subject, for example.

The present invention has been made in view of the above-mentioned problems, and therefore has an object to allow a combined image in which a subject of interest has high image quality to be obtained with a small amount of processing.

Preferred embodiments of the present invention will now be described in detail in accordance with the accompanying drawings.

(First Embodiment)

Figure 1:
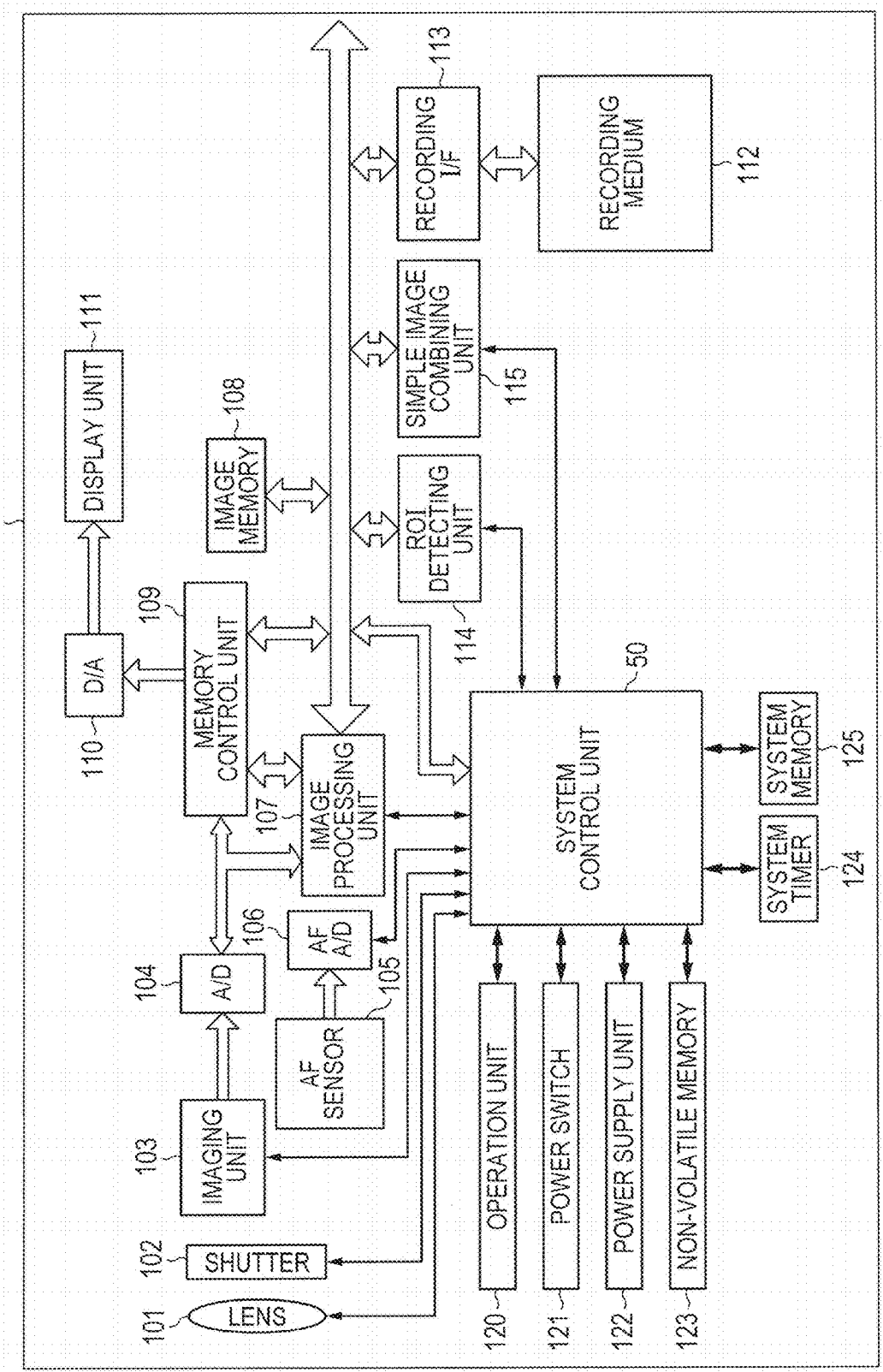
FIG. 1 is a block diagram for illustrating a configuration example an image pickup apparatus according to a first embodiment of the present invention.

FIG. 1 is a block diagram for illustrating a configuration example of an image pickup apparatus 100 according to a first embodiment of the present invention. The image pickup apparatus 100 in this embodiment has an image combining function, and selects images to be combined in accordance with region-of-interest (ROI) information to perform combining processing. Now, components of the image pickup apparatus 100 in this embodiment are described with reference to FIG. 1.

In FIG. 1, a lens 101 is a lens unit including a zoom lens and a focus lens, and a shutter 102 has a diaphragm function. An imaging unit 103 includes a charge coupled device (CCD), a complementary metal oxide semiconductor (CMOS) element, or the like for converting an optical image into an electric signal. An analog/digital (A/D) converter 104 converts an analog signal output by the imaging unit 103 into a digital signal. An autofocus (AF) sensor 105 is a sensor including a CCD, a CMOS element, or the like for converting the optical image into an electric signal for AF control. An AF A/D converter 106 is a converter for converting an analog signal output by the AF sensor 105 into a digital signal.

An image processing unit 107 subjects image data output from the A/D converter 104 to various image processing such as noise reduction processing, white balancing, gamma (γ) processing, and resolution conversion processing. A memory control unit 109 is a control unit for controlling an image memory 108, and a digital/analog (D/A) converter 110 converts an input digital signal into an analog signal. A display unit 111 is, for example, a liquid crystal display (LCD). A recording medium 112 is a memory card, a hard disk, or the like for recording the image data. A recording interface (I/F) 113 is an interface with the recording medium 112.

The image pickup apparatus 100 according to this embodiment includes an ROI detecting unit 114 and a simple image combining unit 115. The ROI detecting unit 114 detects a subject region of interest from among subjects present in the image data, and the simple image combining unit 115 combines a plurality of images.

A system control unit 50 controls the entire system of the image pickup apparatus 100. An operation unit 120 receives various operational instructions as inputs from a user. A power switch 121 is a switch for switching a power supply unit 122 on/off. A non-volatile memory 123 is an electrically erasable and writable memory, and includes, for example, an electrically erasable programmable read-only memory (EE-PROM). A system timer 124 measures time used for various control and time of a built-in clock. Moreover, a system memory 125 is a memory for extracting constants and variables for operation of the system control unit a program read from the non-volatile memory 123, and the like.

Next, a flow of basic processing at the time of capturing images in the image pickup apparatus 100 configured as described above is described.

First, the imaging unit 103 photoelectrically converts light that enters through the lens 101 and the shutter 102, and outputs the result as analog image signals to the A/D converter 104. Moreover, the imaging unit 103 generates a plurality of image signals while changing photographic conditions such as an exposure. The A/D converter 104 converts the analog image signals output from the imaging unit 103 into digital image signals and outputs the digital image signals to the image processing unit 107. The AF sensor 105 receives the light that enters through the lens 101 and the shutter 102 with a plurality of paired line sensors, and outputs analog signals to the AF A/D converter 106. The AF A/D converter 106 converts the analog signals output from the AF sensor 105 into digital signals, and outputs the digital signals to the system control unit 50. The system control unit 50 detects, based on image signals output by a pair of line sensors, a relative positional shift amount in a splitting direction of a light beam from the subject, and performs so-called phase difference AF control.

The image processing unit 107 subjects the image data input from the A/D converter 104 to first image processing such as the noise reduction processing, the white balancing, and the resolution conversion processing. In addition, the image processing unit 107 subjects the image data read from the image memory 108 via the memory control unit 109 so second image processing such as the γprocessing and color correction processing. The image data output from the image processing unit 107 is written in the image memory 108 via the memory control unit 109.

In this embodiment, in a case where the combining processing is performed, the image processing unit 107 first performs the first image processing on the plurality of images, and the simple image combining unit 115 then uses the plurality of images on which the first image processing has been performed to perform simple image combining processing. Thereafter, an operation is performed so that the second image processing is performed on the combined image. Moreover, in the image processing unit 107, the image data generated by the imaging unit 103 is used to perform predetermined computing processing, and based on the obtained computing result, the system control unit 50 performs exposure control and ranging control. In this manner, automatic exposure (AE) processing, contrast auto-focus (AF) processing, and the like are performed.

The image memory 108 stores she image data output from the imaging unit 103, the image data output from the image processing unit 107, image data to be displayed on the display unit 111, and the like.

Moreover, the D/A converter 110 converts the image data for display, which is stored in the image memory 108, into the analog signals and supplies the analog signals to the display unit 111. The display unit 111 displays an image corresponding to the analog signals from the D/A converter 110 on a display such as the LCD.

The ROI detecting unit 114 detects the subject region of interest from among the subjects present in the image, and outputs the subject region of interest as the ROI information to the system control unit. 50. The simple image combining unit 115 selects, based on the ROI information, images to be used for simple image combining from among the plurality of images on which she image processing unit 107 has performed the first image processing, and performs the simple image combining processing. Note that, details of the processing by the ROI detecting unit 114 and the simple image combining unit 115 are described later.

Moreover, in addition to the basic operation described above, the system control unit 50 executes programs recorded in the non-volatile memory 123 described above to realize various processing in this embodiment, which is described later. The term "program" as used herein refers to a program for executing various flow charts to be described later in this embodiment. At this time, the constants and variables for the operation of the system control unit 50, the program read from the non-volatile memory 123, and the like are extracted on the system memory 125.

Next, the processing of the ROI detecting unit 114 and the simple image combining unit 115 is described in detail. Note that, in this embodiment, a scene in which the subject of interest is stationary is described as an example.

First, the ROI detecting unit 114 is described in detail with reference to FIGS. 2 and 3.

FIG. 2 is a diagram for illustrating examples of three images captured with different exposures by the image pickup apparatus 100. The upper image of FIG. 2 is an example of an image captured with a low exposure, the middle image of FIG. 2 is an example of an image captured with an intermediate exposure, and the lower image of FIG. 2 is an example of an image captured with a high exposure, each of which is a scene in which a car 201 is stationary.

In a case of the low exposure, the captured image of the subject becomes dark, and in a case of the high exposure, the captured image of the subject becomes bright. Therefore, in the example of the car 201 illustrated in FIG. 2, the low exposure image and the intermediate exposure image of the car 201 are captured without causing the halation, but in the high exposure image, the exposure is too high and the halation appears around the car 201. With a high dynamic range function, a plurality of images at different exposures may be used for combining with the low exposure image being weighted in a bright region (halation or the like) and, on the contrary, the high exposure image being weighted in a dark region to improve the halation and an impression of noise in a dark part.

The ROI detecting unit 114 detects a region of interest from at least one image of the plurality of images at the different exposures. FIG. 3 is a diagram for illustrating an example of the ROI information detected from the low exposure image of FIG. 2. The example illustrated in FIG. 3 represents an example in which the car is detected as the region of interest, and the solid white region indicates the region of interest. Here, as a method of detecting the region of interest, a known technology is used, and a detailed description thereof is omitted. The known technology includes, for example, a face detection technology or a human body detection technology. Moreover, a subject to be tracked or a subject to be focused on may be set as the region of interest, or a subject that is frequently photographed by a photographer may be recognized and set as the region of interest. Moreover, the photographer may operate the operation unit 120 to select a subject of interest as the region of interest.

Figure 3:
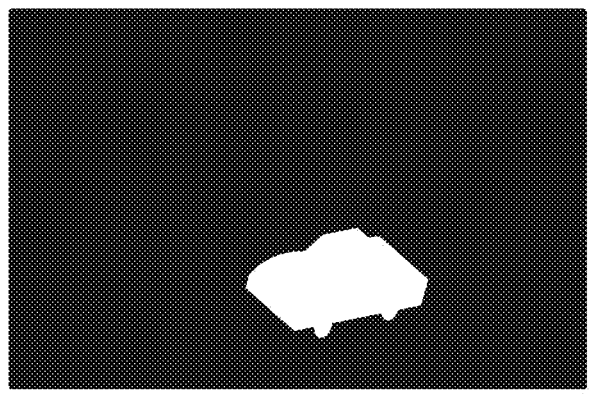
FIG. 3 is a diagram for illustrating an example of region-of-interest (ROI) information detected from a low exposure image in FIG. 2.

The ROI detecting unit 114 calculates the ROI information as illustrated in FIG. 3 in the processing as described above, and outputs the ROI information to the system control unit 50. Note that, the image from which the region of interest is to be detected is not limited to the low exposure image, and may be the intermediate exposure image or the high exposure image.

Next, the simple image combining unit 115 is described in detail.

Figure 4:
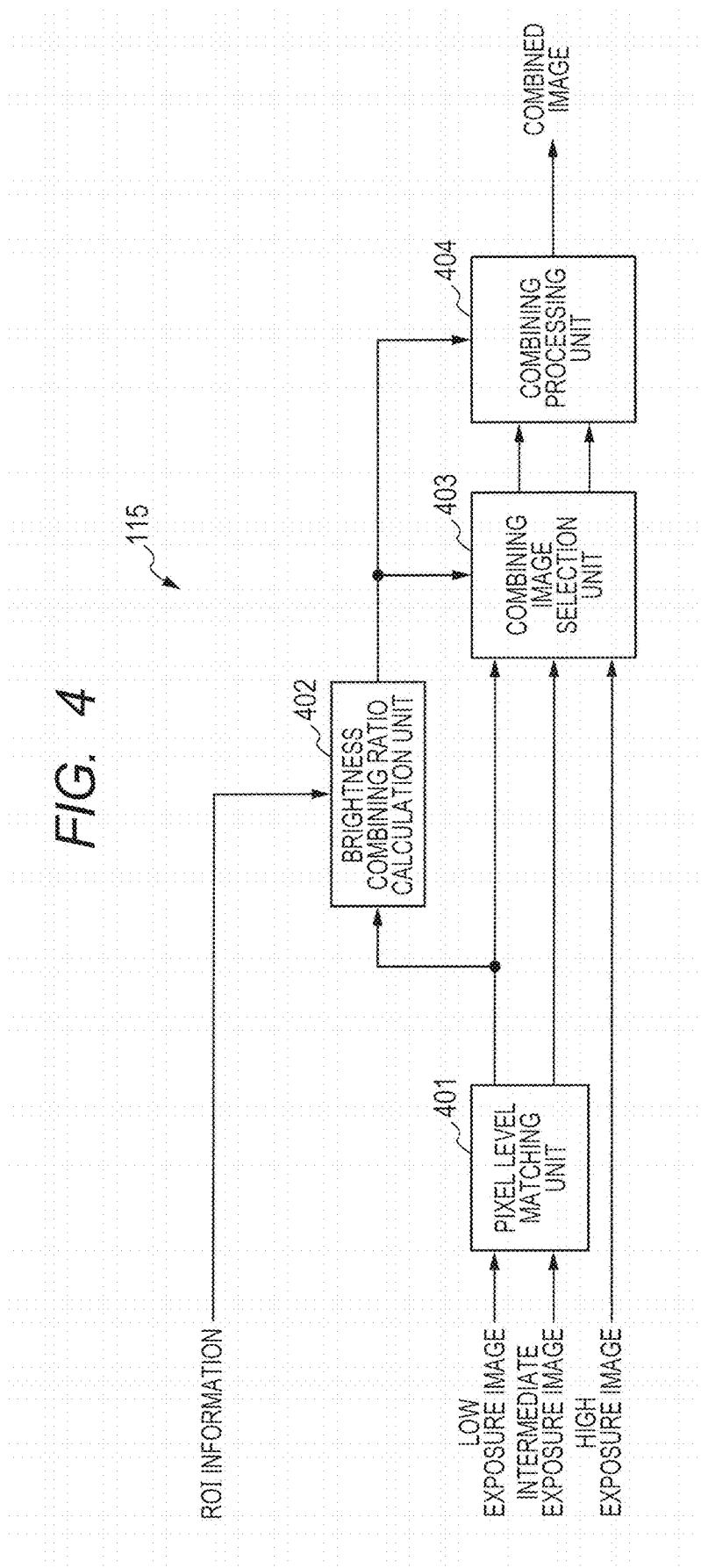
FIG. 4 is a block diagram for illustrating a detailed configuration example of a simple image combining unit illustrated in FIG. 1.

FIG. 4 is a block diagram for illustrating a detailed configuration example of the simple image combining unit 115. As illustrated in FIG. 4, the simple image combining unit 115 includes a pixel level matching unit 401, a brightness combining ratio calculation unit 402, a combining image selection unit 403, and a combining processing unit 404.

Figure 5:
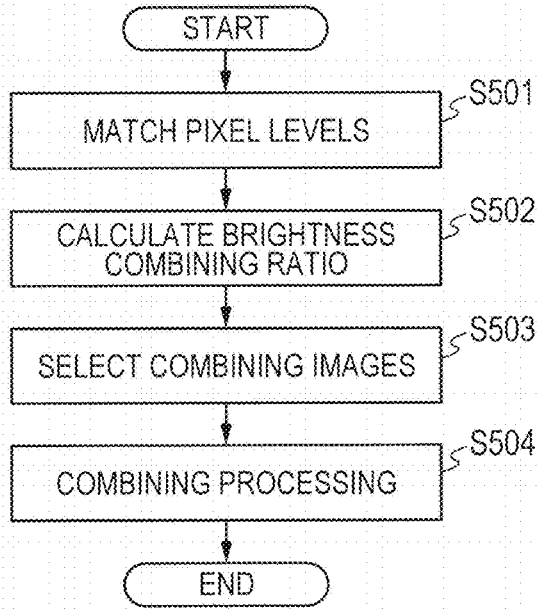
FIG. 5 is a flow chart for illustrating an example of a combining processing procedure in the first embodiment.

FIG 5 is a flow chart for illustrating an example of a combining processing procedure by the simple image combining unit 115. Now, an operation of the simple image combining unit 115 is described in accordance with the flow chart of FIG. 5.

First, in Step S501, the pixel level matching unit 401 matches pixel levels of the plurality of images on which the image processing unit 107 has performed the first image processing. In this embodiment, an example in which the pixel levels of the low exposure image and the intermediate exposure image are amplified to be matched to those of the high exposure image.

Figure 6:
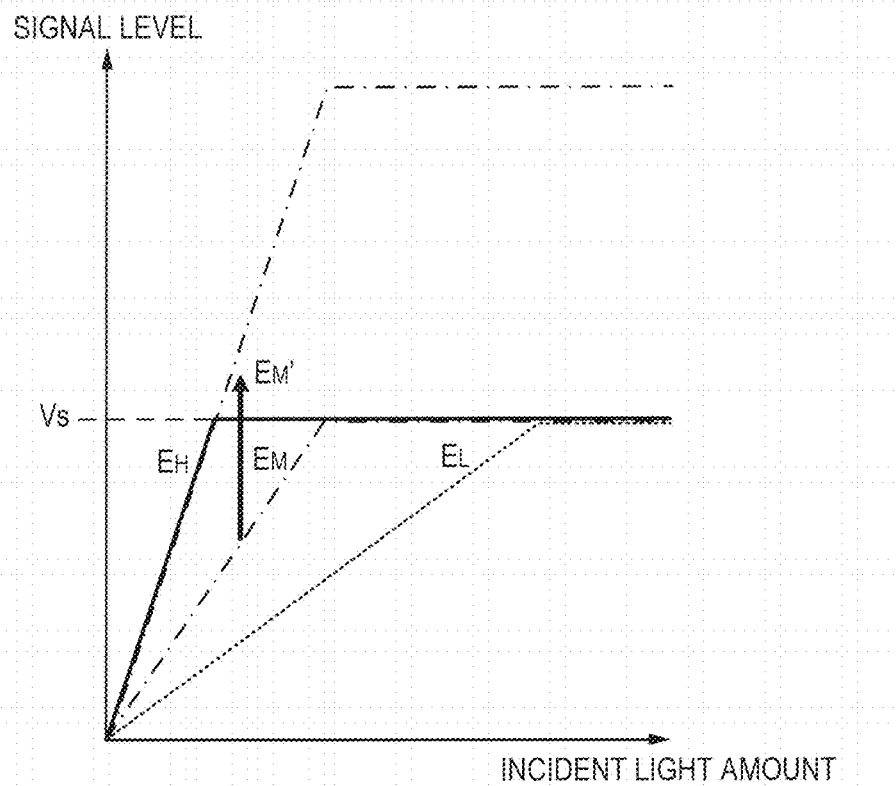
FIG. 6 is a graph for showing a relationship of an incident light amount in an imaging unit and a signal level.

FIG. 6 is a graph for showing a relationship of an incident light amount in the imaging unit 103 and a signal level, and is a relationship of a low exposure image $E_L$, an intermediate exposure image $E_M$, and a high exposure image $E_H$. The imaging unit 103 includes an image pickup element in which the incident light amount and the signal level have a linear characteristic as shown in FIG. 6, and has a characteristic that, when the incident light amount is doubled, the signal level is also doubled. Note that, the images input to the pixel level matching unit 401 are images on which only the first image processing has been performed by the image processing unit 107 and the γ processing has not been performed, and hence have the linear characteristic as shown in FIG. 6.

In a case where the imaging unit 103 changes exposure time to generate the images at different exposures, in the example shown in FIG. 6, the exposure time of the high exposure image $E_H$ twice the time of the intermediate exposure image $E_M$. Moreover, the exposure time of the high exposure image $E_H$ is four times the time of the low exposure image $E_L$. Therefore, in order to match brightnesses of the high exposure image $E_H$ and the intermediate exposure image $E_M$, the signal levels of the intermediate exposure image $E_M$ only need to be doubled ($E_M'$ in FIG. 6). Similarly, in order to match brightnesses of the high exposure image $E_H$ and the low exposure image $E_L$, the signal levels of the low exposure image $E_L$ only need to be multiplied by 4.

Note that, the method of matching the pixel levels does not always need to be the method in which the signal levels are multiplied as in the example shown in FIG. 6. Moreover, the method of matching does not need to be the method in which the pixel levels of the low exposure image and the intermediate exposure image are matched to those of the high exposure image. For example, the signal levels of the high exposure image $E_H$ may be reduced to be matched to the pixel levels of the intermediate exposure image $E_M$.

Next in Step S502, the brightness combining ratio calculation unit 402 calculates brightness combining ratios based on any one of the three images at the different exposures that have been matched in brightness to the ROI information. In this embodiment, an example in which the brightness combining ratios are calculated based on the low exposure image that has been matched in brightness is described.

Figure 7:
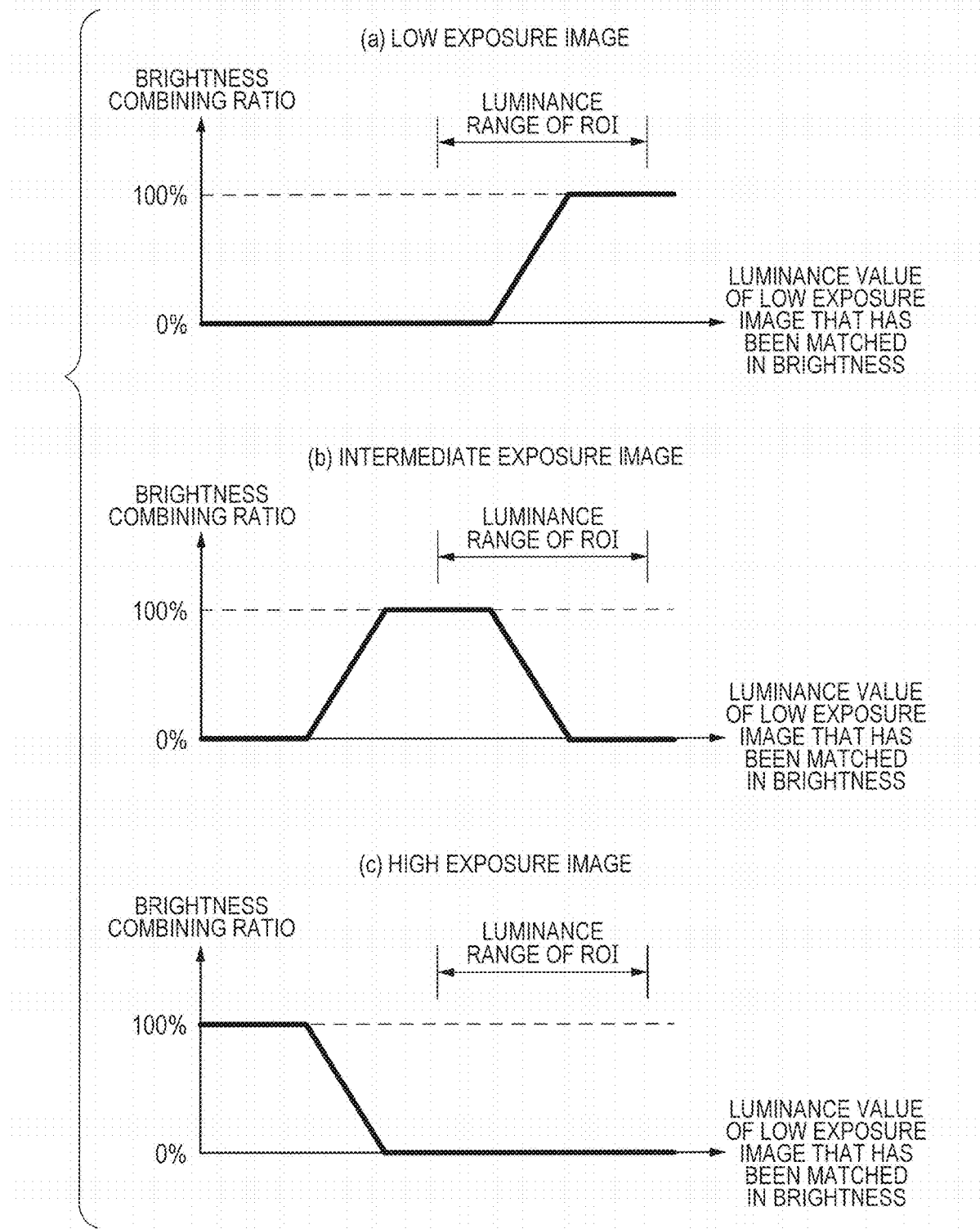
FIG. 7 is a graph for showing expressions for calculating brightness combining ratios for the images at the different exposures.

The brightness combining ratio calculation unit 402 calculates, based on luminance values in the region of interest of the low exposure image that has been matched in brightness as illustrated in FIG. 3, for example, brightness combining ratios for the images at the different exposures with different calculation expressions as shown in FIG. 7, respectively. In other words, the brightness combining ratios are calculated for each pixel in the region of interest.

FIG. 7 is a graph for showing expressions for calculating the brightness combining ratios for the images at the different exposures, in which the horizontal axis indicates the luminance value of the low exposure image that has been matched in brightness, and the vertical axis indicates the brightness combining ratio for each image. The upper graph of FIG. 7 is an expression for calculating a brightness combining ratio for the low exposure image. As compared to the images at the other exposures, the low exposure image is least likely to cause the halation in the bright part, but has the largest impression of noise in the dark part. Therefore, the low exposure image is controlled to have a high combining ratio in the bright part as shown in the upper graph of FIG. 7. Moreover, the lower graph of FIG. 7 is an expression for calculating a brightness combining ratio for the high exposure image. As compared to the images at the other exposures, the high exposure image has the smallest impression of noise in the dark part, but is most likely to cause the halation in the bright part. Therefore, the high exposure image is controlled to have a high combining ratio in the dark part as shown in the lower graph of FIG. 7. Further, the middle graph of FIG. 7 is an expression for calculating a brightness combining ratio for the intermediate exposure image. As compared to the images at the other exposures, the intermediate exposure image has an intermediate impression of noise in the dark part and an intermediate degree halation in the bright part. Therefore, the intermediate exposure image is controlled to have a high combining ratio in an intermediate luminance part as shown in the middle graph of FIG. 7. As described above, the brightness combining ratios may be controlled to set a combining ratio of a luminance range with high image quality of each image high.

Next in Step S503, the combining image selection unit 403 determines whether or not the brightness combining ratio of every pixel in the region of interest is 0% for each image. When the brightness combining ratio of every pixel in the region of interest is 0%, the image is unnecessary for combining the region of interest. For example, in the examples as illustrated in FIG. 2, luminance values of the car as the region of interest are distributed in a high luminance range, and are distributed in a luminance range as shown in FIG. 7. In such luminance range of the region of interest, as shown in the lower graph of FIG. 7, the brightness combining ratio of the high exposure image is 0% for every pixel in the region of interest. Therefore, the high exposure image is an image that is unnecessary for combining the region of interest.

On the other hand, as shown in the upper and middle graphs of FIG. 7, in view of the luminance range of the region of interest, the low exposure image and the intermediate exposure image contain pixels having brightness combining ratios that are larger than 0%. Therefore, the low exposure image and the intermediate exposure image are images that are necessary for combining the region of interest. In this manner, the combining image selection unit 403 determines, based on the brightness combining ratios in the region of interest, whether or not the image is necessary for combining the region interest, and outputs the images that are necessary for combining to the combining processing unit 404.

Next in Step S504, the combining processing unit 404 takes a weighted sum of the region of interest of the images selected by the combining image selection unit 403 in accordance with the brightness combining ratios calculated by the brightness combining ratio calculation unit 402. Moreover, for regions other than the region of interest, weighted sum processing is not performed, and an image at a lower exposure of the images selected by the combining image selection unit 403 is used as a substitute, for example. As described above, according to this embodiment, the combining processing is performed only on the images that are necessary for combining the region of interest, with the result that the combined image in which the region of interest has the high image quality may be obtained with the small amount of processing.

Note that, in the above description, the example in which the weighted sum processing is not performed on the regions other than the region of interest has been described, but the weighted sum processing may be performed also on the regions other than the region of interest. In this case, as the brightness combining ratio for the intermediate exposure image, a ratio obtained by adding the brightness combining ratio of the high exposure image thereto is used. In this manner, the pixels for which it is originally desired to output the high exposure image may be replaced by the pixels of the intermediate exposure image for output. Therefore, weighted sums may be taken for the regions other than the region of interest with only the low exposure image and the intermediate exposure image.

Moreover, in the above description, in the case where the brightness combining ratio of every pixel in the region of interest is 0%, the combining image selection unit 403 determines that the image is unnecessary combining the region of interest, but a determination criterion is not limited thereto. For example, when the brightness combining ratio of every pixel in the region of interest is a predetermined value (for example, 1%) or lower, it may be determined that the image is unnecessary for combining the region of interest.

Moreover, in this embodiment, in a case where the dynamic range (luminance range) of the region of interest is wide and there is no image in which the brightness combining ratio of every pixel in the region of interest is 0%, for example, all the images at the different exposures are necessary for combining the region of interest. In such case, the combining image selection unit 403 may integrate brightness combining ratios in the region of interest for each image, and an image for which an integrated value of the brightness combining ratios is smaller than a predetermined value may be determined to be unnecessary for combining the region of interest. Alternatively, the combining image selection unit 403 may select a predetermined number of images in a decreasing order of integrated values of brightness combining ratios. In other words, images that make higher contributions on the combined image are preferentially selected to perform the combining processing, with the result that the combined image in which the region of interest has as high image quality as possible may be obtained with the small amount of processing. Still alternatively, irrespective of the combining ratios, the predetermined number of images may be selected in an increasing order of exposures.

On the other hand, in a case where there is only one image in which the brightness combining ratios in the region of interest exceed 0%, the combining processing unit 404 may not perform the weighted sum processing but output the one image in the region of interest. Moreover, in the above description, the example in which the three images at the different exposures are generated and combined has been described, but a sequence of image capturing and combining is not limited thereto. For example, a set of capturing and combining the three images at the different exposures may be repeated in succession to obtain combined images as a moving image. In other words, this embodiment may also be adapted to a case of obtaining the combined images as the moving image.

(Second Embodiment)

Next, a second embodiment of the present invention is described. In this embodiment, an example in which a combined image is generated of a scene in which a subject of interest is moving is described.

Figure 8:
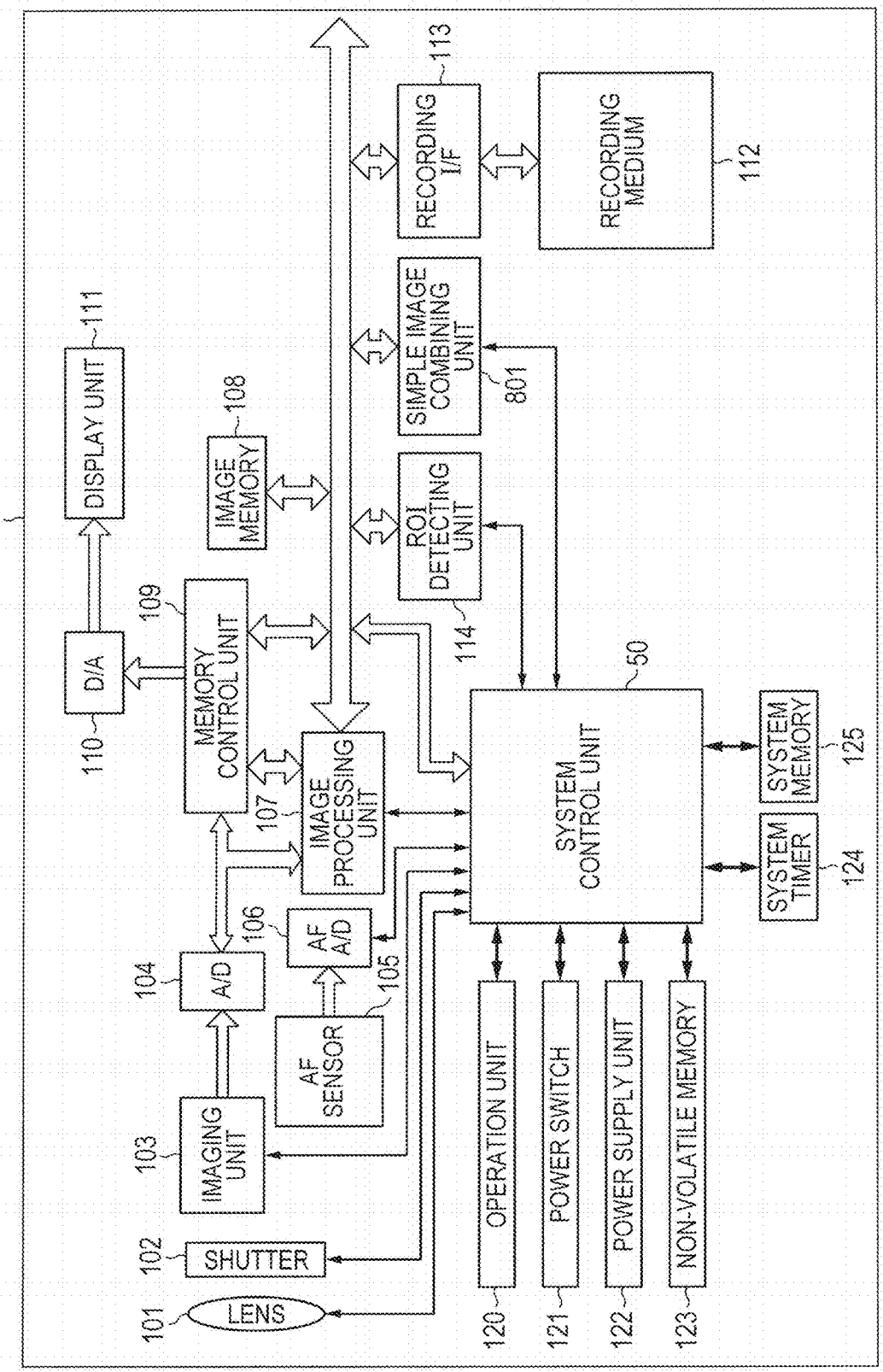
FIG. 8 is a block diagram for illustrating a configuration example of an image pickup apparatus according to a second embodiment of the present invention.

FIG. 8 is a block diagram for illustrating a configuration example of an image pickup apparatus 800 according to a second embodiment of the present invention. Now, components of the image pickup apparatus 800 according to this embodiment are described with reference to FIG. 8. Note that, the components having the same reference numerals as those of FIG. 1 perform similar processing as in the first embodiment, and hence a description thereof is omitted.

In this embodiment, a configuration and an operation of a simple image combining unit 801 are different from those of the simple image combining unit 115 in FIG. 1. The other configurations and operations are similar to those in the first embodiment, and hence a description thereof is omitted. Now, the simple image combining unit 801 in this embodiment is described in detail.

First, the scene and processing of detecting a region of interest are described.

FIG. 9 is a diagram for illustrating examples of three images captured with different exposures by the image pickup apparatus 800. The upper image of FIG. 9 an example of an image captured with a low exposure, the middle image of FIG. 9 is an example of an image captured with an intermediate exposure, and the lower image of FIG. 9 is an example of an image captured with a high exposure, each of which is a scene in which a car 901 is moving from right to left of the drawing sheet. Note that, the examples illustrated in FIG. 9 are similar to the examples illustrated in FIG. 2 except that a position of the car 901 as the subject is different for each image.

Figure 10:
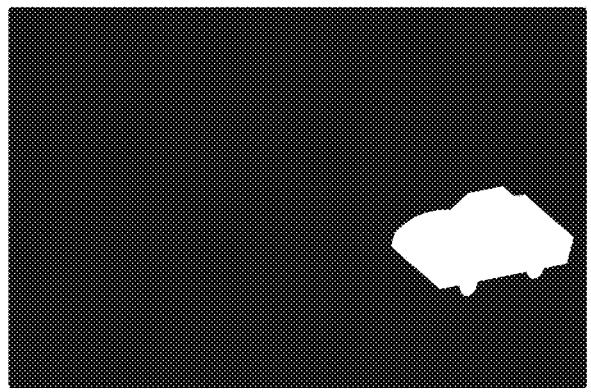
FIG. 10 is a diagram for illustrating an example of ROI information detected from a low exposure image in FIG. 9.

The ROI detecting unit 114 detects, similarly to the first embodiment, a region of interest from at least one image of the plurality of images at the different exposures. FIG. 10 is a diagram for illustrating an example of the ROI information detected from the low exposure image in the upper image of FIG. 9. The example illustrated in FIG. 10 represents, similarly to FIG. 3, an example in which the car is detected as the region of interest, and the solid white region indicates the region of interest. A method of detecting the region of interest is similar to that of the first embodiment.

The ROI detecting unit 114 calculates the ROI information as illustrated in FIG. 10 in the processing as described above, and outputs the ROI information to the system control unit 50. In this embodiment in which the position of the region of interest is different for each image, the image from which the region of interest is to be detected is not limited to the low exposure image, and may be the intermediate exposure image or the high exposure image. For example, when the region of interest is detected with an image that is captured first, the region of interest may be detected with an image that is closest to a timing when a shutter button is depressed. Therefore, in an image including a moving subject, the region of interest may be detected as a position desired by the user. In the example illustrated in FIG. 9, the low exposure image is generated first, and hence the ROI information is detected from the low exposure image.

Next, the simple image combining unit 801 is described in detail.

Figure 11:
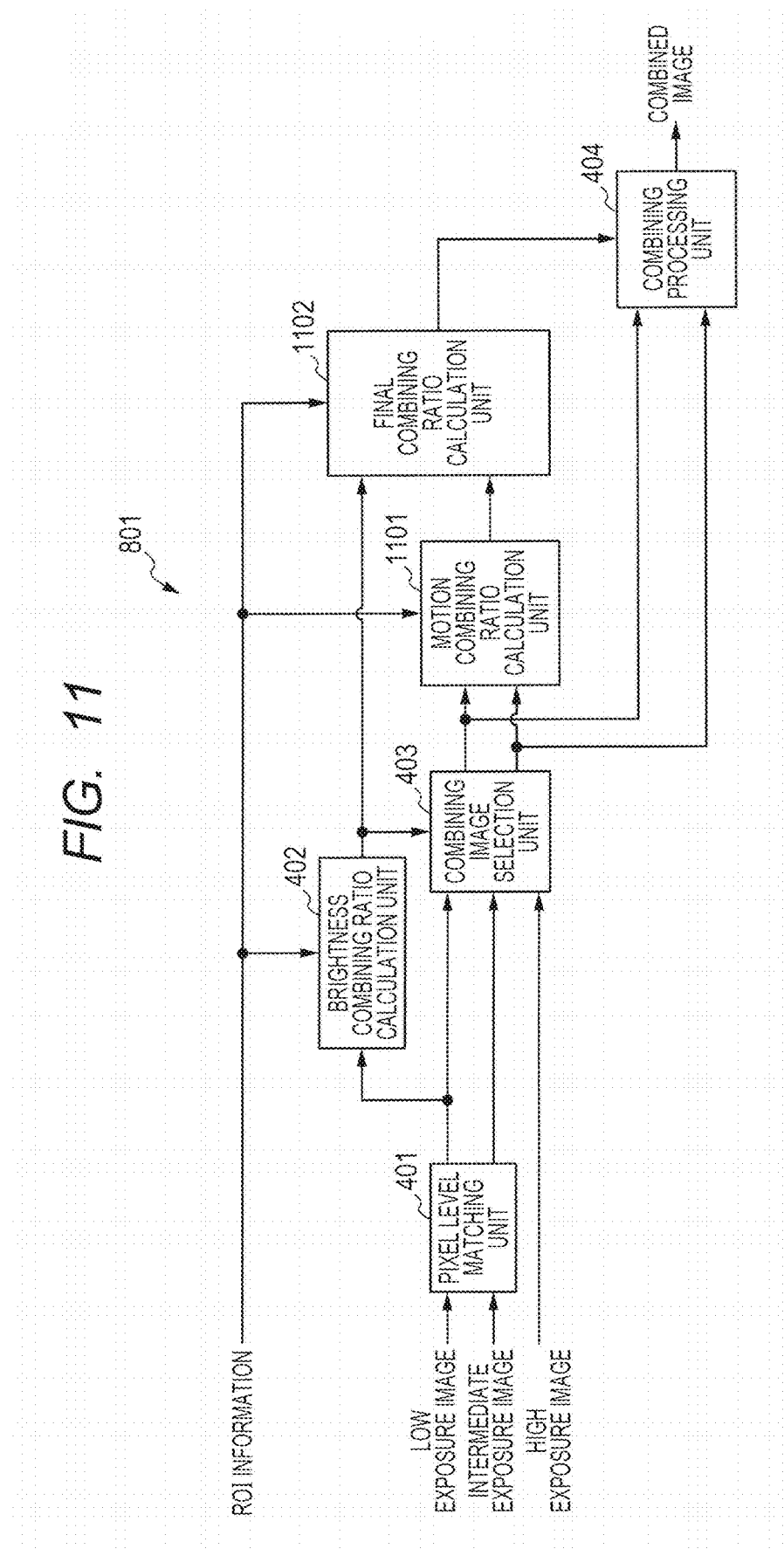
FIG. 11 is a block diagram for illustrating a detailed configuration example of a simple image combining unit illustrated in FIG. 8.

FIG. 11 is a block diagram for illustrating a detailed configuration example of the simple image combining unit 801. As illustrated in FIG. 11, the simple image combining unit 801 includes the pixel level matching unit 401, the brightness combining ratio calculation unit 402, the combining image selection unit 403, a motion combining ratio calculation unit 1101, a final combining ratio calculation unit 1102, and the combining processing unit 404. Note that, the pixel level matching unit 401, the brightness combining ratio calculation unit 402, the combining image selection unit 403, and the combining processing unit 404 are similar to those illustrated in FIG. 4, respectively.

Figure 12:
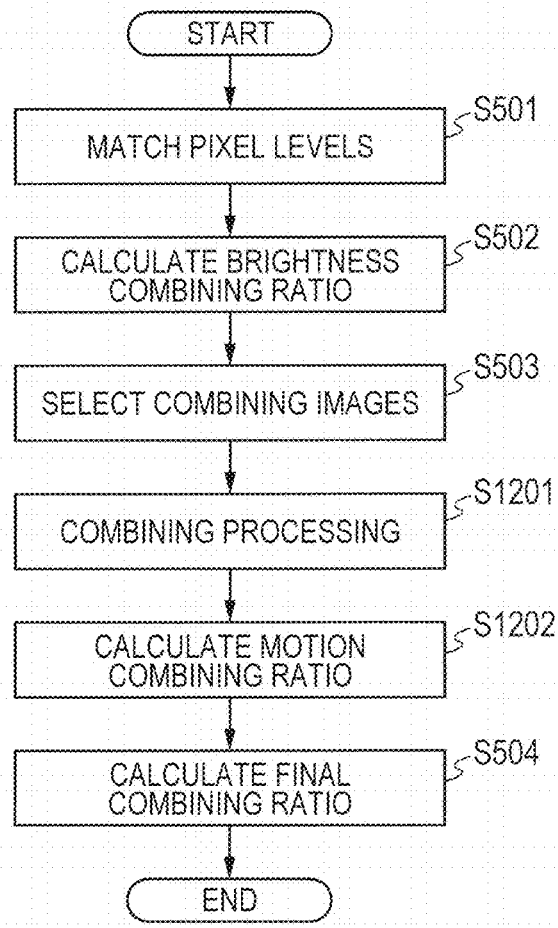
FIG. 12 is a flow chart for illustrating an example of a combining processing procedure in the second embodiment.

FIG. 12 is a flow chart for illustrating an example of a processing procedure by the simple image combining unit 801. Now, the operation of the simple image combining unit 801 is described in accordance with the flow chart of FIG. 12. Here, processing in Steps S501, S502, and S503 is similar to the processing illustrated in FIG. 5, and hence a description thereof is omitted.

In Step S1201, the motion combining ratio calculation unit 1101 receives the ROI information and the images to be combined which are selected by the combining image selection unit 403, as inputs, and calculates difference absolute values of pixels between the selected images to be combined. Then, as shown in FIG. 13, based on the difference absolute values of the pixels between the images, the motion combining ratio calculation unit 1101 calculates a motion combining ratio for each pixel of the region of interest.

Figure 13:
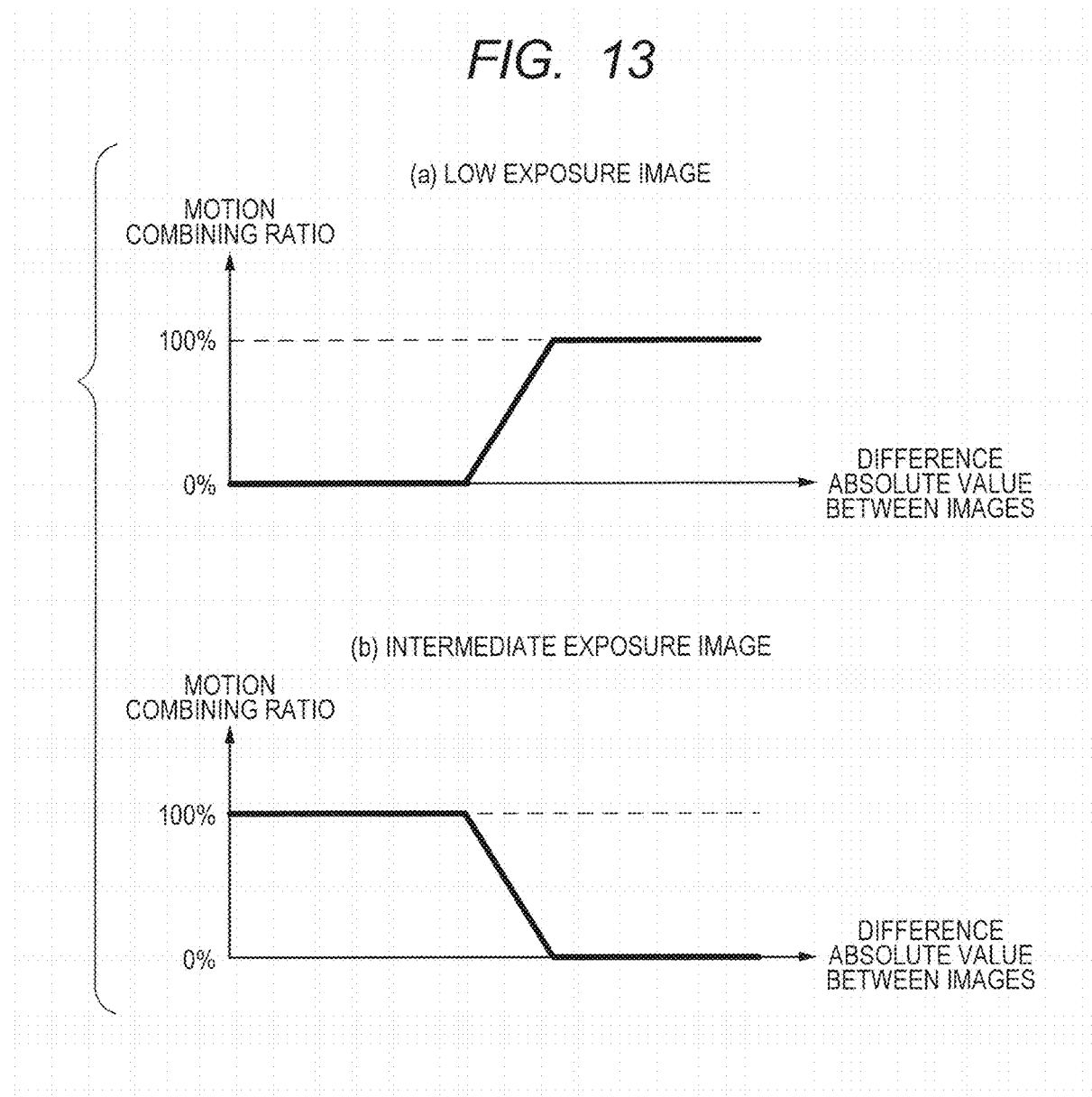
FIG. 13 is a graph for showing expressions for calculating motion combining ratios.

FIG. 13 is expressions for calculating motion combining ratios, in which the horizontal axis indicates the difference absolute value between the images, and the vertical axis indicates the motion combining ratio for each image. Examples shown in FIG. 13 are examples in a case where the combining image selection unit 403 has selected the low exposure image and the intermediate exposure image. The upper graph of FIG. 13 is an expression for calculating a motion combining ratio for the low exposure image. In the low exposure image, as shown in the upper graph of FIG. 13, in a range with motion in which the difference absolute value is large, the motion combining ratio is controlled to be high. On the other hand, the lower graph of FIG. 13 is an expression for calculating a motion combining ratio for the intermediate exposure image. In the intermediate exposure image, as shown in the lower graph of FIG. 13, in the range in which the difference absolute value is large, the motion combining ratio is controlled to be low.

As described above, the motion combining ratio may be controlled to calculate a combining ratio with which a weighted sum is not taken (combining is not performed) and the low exposure image, which is least likely to cause the halation, is output for the moving subject (that is, the region in which the difference absolute value is large). Therefore, there may be obtained the combined image in which the moving subject does not generate a ghost and the halation does not appear around the subject.

Next in Step S1202, the final combining ratio calculation unit 1102 compares, for each pixel of the region of interest, a value of the brightness combining ratio and a value of the motion combining ratio of an image at the lowest exposure of the selected images. Then, the final combining ratio calculation unit 1102 selects a combining ratio with the larger value, and outputs the combining ratio as a final combining ratio of the image at the lowest exposure to the combining processing unit 404. For example, in a case where the brightness combining ratio is 80% and the motion combining ratio is 40%, the final combining ratio calculation unit 1102 outputs the brightness combining ratio of 80% as the final combining ratio. As final combining ratios for the other images, the final combining ratio calculation unit 1102 selects the brightness combining ratio or the motion combining ratio in accordance with a comparison result of the combining ratios of the image at the lowest exposure, and outputs the combining ratio as the final combining ratio to the combining processing unit 404.

Next in Step S504, the combining processing unit 404 takes a weighted sum of the region of interest of the images selected, by the combining image selection unit 403 in accordance with the final combining ratios calculated by the final combining ratio calculation unit 1102. Moreover, for regions other than the region of interest, weighted sum processing is not performed, and an image at a lower exposure of the images selected by the combining image selection unit 403 is used as a substitute, for example. As described above, the combining processing is performed only on the images that are necessary for combining the region of interest, with the result that the combined image in which the region of interest has the high image quality may be obtained with the small amount of processing. For the moving subject, in particular, only the image at the low exposure is more likely to be selected, and hence there may be obtained the combined image in which the moving subject does not generate the ghost and the halation does not appear around the subject.

(Third Embodiment)

Next, a third embodiment of the present invention is described. In this embodiment, an example in which the simple combining processing described in the second embodiment as well as main combining processing is performed is described.

Figure 14:
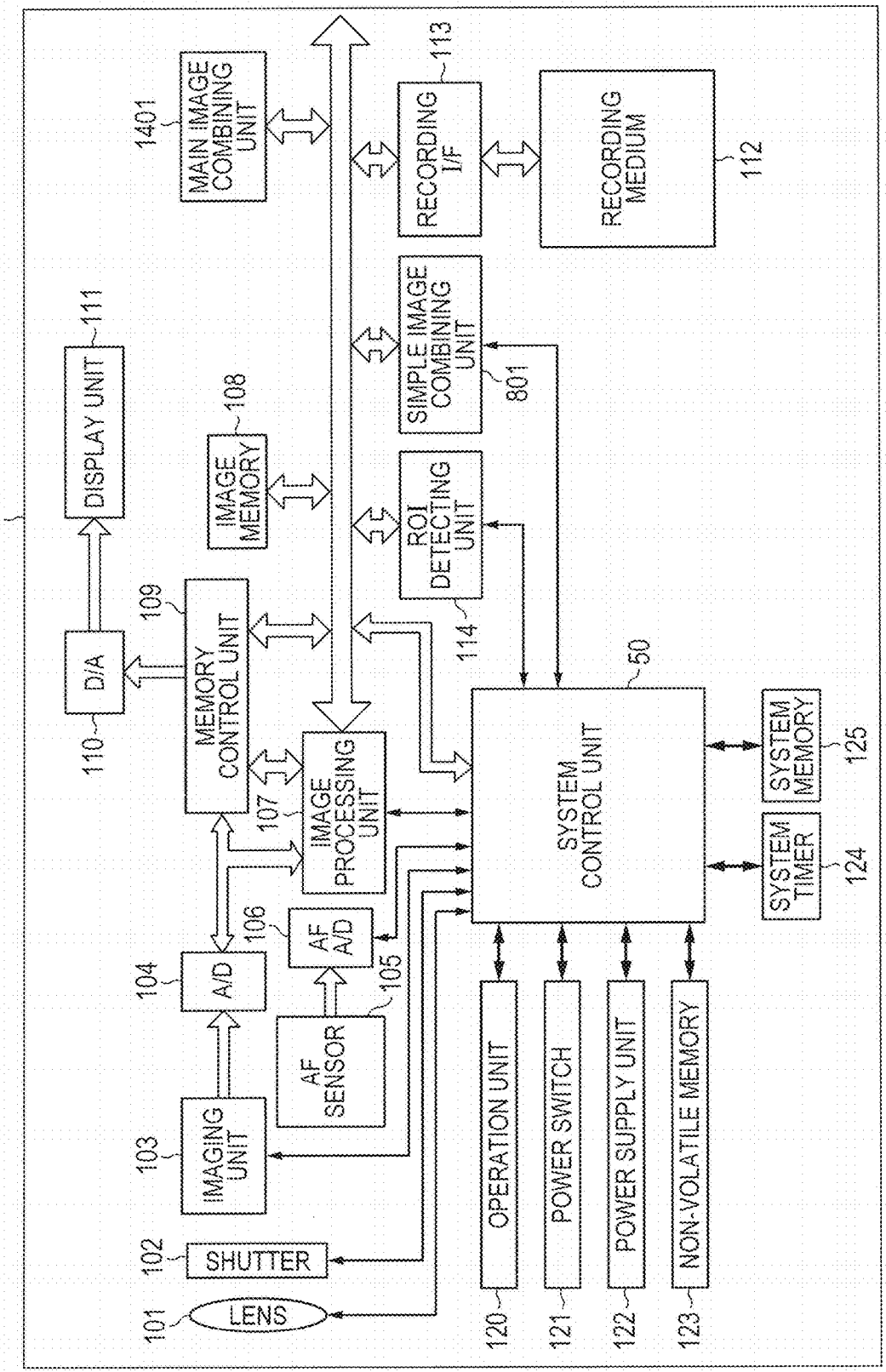
FIG. 14 is a block diagram for illustrating a configuration example an image pickup apparatus according to a third embodiment of the present invention.

FIG. 14 is a block diagram for illustrating a configuration example of an image pickup apparatus 1400 according to a third embodiment of the present invention. Note that, the components having the same reference numerals as those of FIG. 1 or FIG. 8 perform similar processing as in the first or second embodiment, and hence a description thereof is omitted.

As compared to the image pickup apparatus 800 illustrated in FIG. 8, the image pickup apparatus 1400 according to this embodiment is configured to further include a main image combining unit 1401. The other components and operations are similar to those in the first or second embodiment, and hence a description thereof is omitted.

Figure 15:
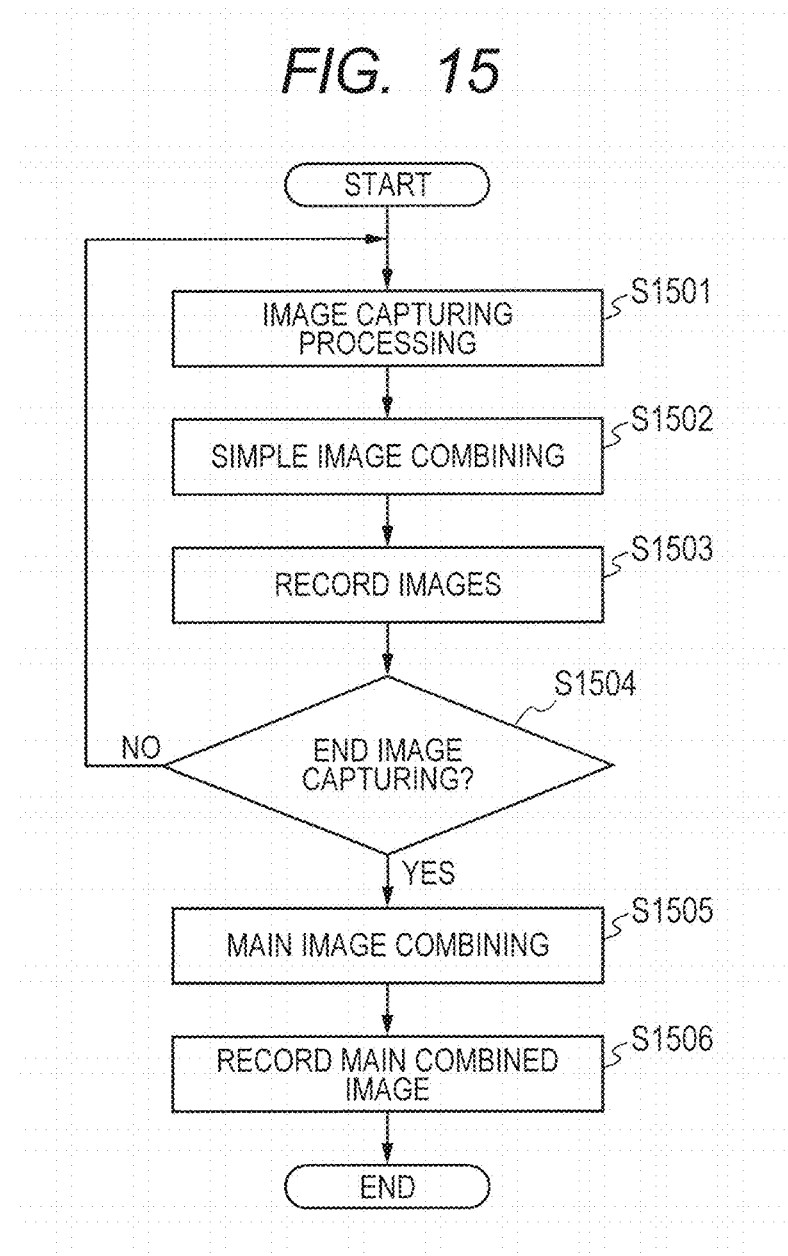
FIG. 15 is a flow chart for illustrating an example of a series of photographing processing procedure in the third embodiment.

FIG. 15 is a flow chart for illustrating an example of a series of photographing processing procedure by the image pickup apparatus 1400 according to this embodiment. Now, an operation of the image pickup apparatus 1400 according to this embodiment is described in accordance with the flow chart of FIG. 15.

When receiving an instruction to start capturing a plurality of images with different exposures from the user via the operation unit 120, the system control unit 50 starts processing, and starts image capturing in Step S1501. At this time, the imaging unit 103 generates the plurality of images with the different exposures. Moreover, the plurality of images thus generated are subjected to the first image processing by the image processing unit 107 and stored in the image memory 108.

Subsequently, in Step S1502, the simple image combining unit 801 subjects the plurality of images at the different exposures to the simple combining by the procedure described in the second embodiment, and stores the combined image in the image memory 108 via the memory control unit 109. Further, the simple combined image recorded in the image memory 108 is displayed on the display unit 111 via The memory control unit 109. At this time, data of the simple combined image is subjected to the second image processing by the image processing unit 107, and the simple combined image on which the second image processing has been performed may be recorded on the recording medium 112 by the system control unit 50.

Next in Step S1503, the system control unit 50 records the data of the plurality of images at the different exposures, which are generated by the imaging unit 103, on the recording medium 112 via the recording I/F 113. Note that, the image data on which the first image processing has been performed by the image processing unit. 107 and which is stored in the image memory 108 may be directly recorded on the recording medium 112.

In Step S1504, the system control unit 50 determines whether or not an instruction to end the image capturing has been received from the user via the operation unit 120. As a result of the determination, in a case where the instruction to end the image capturing has not been received, the processing returns to Step S1501 to continue the image capturing. On the other hand, when the instruction to end the image capturing has been received, the image capturing is ended, and the processing proceeds to the next Step S1505.

Next in Step S1505, the main image combining unit 1401 receives the data of she plurality of images at the different exposures as inputs from the recording medium 112, and performs the main combining processing thereon. Details of the operation of the main image combining unit 1401 are described later. Then, in Step S1506, the main image combining unit 1401 records data of the main combined image obtained as the result of performing the main combining processing on the recording medium 112 via the recording I/F 113.

Next, the main image combining unit 1401 in this embodiment is described in detail.

Figure 16:
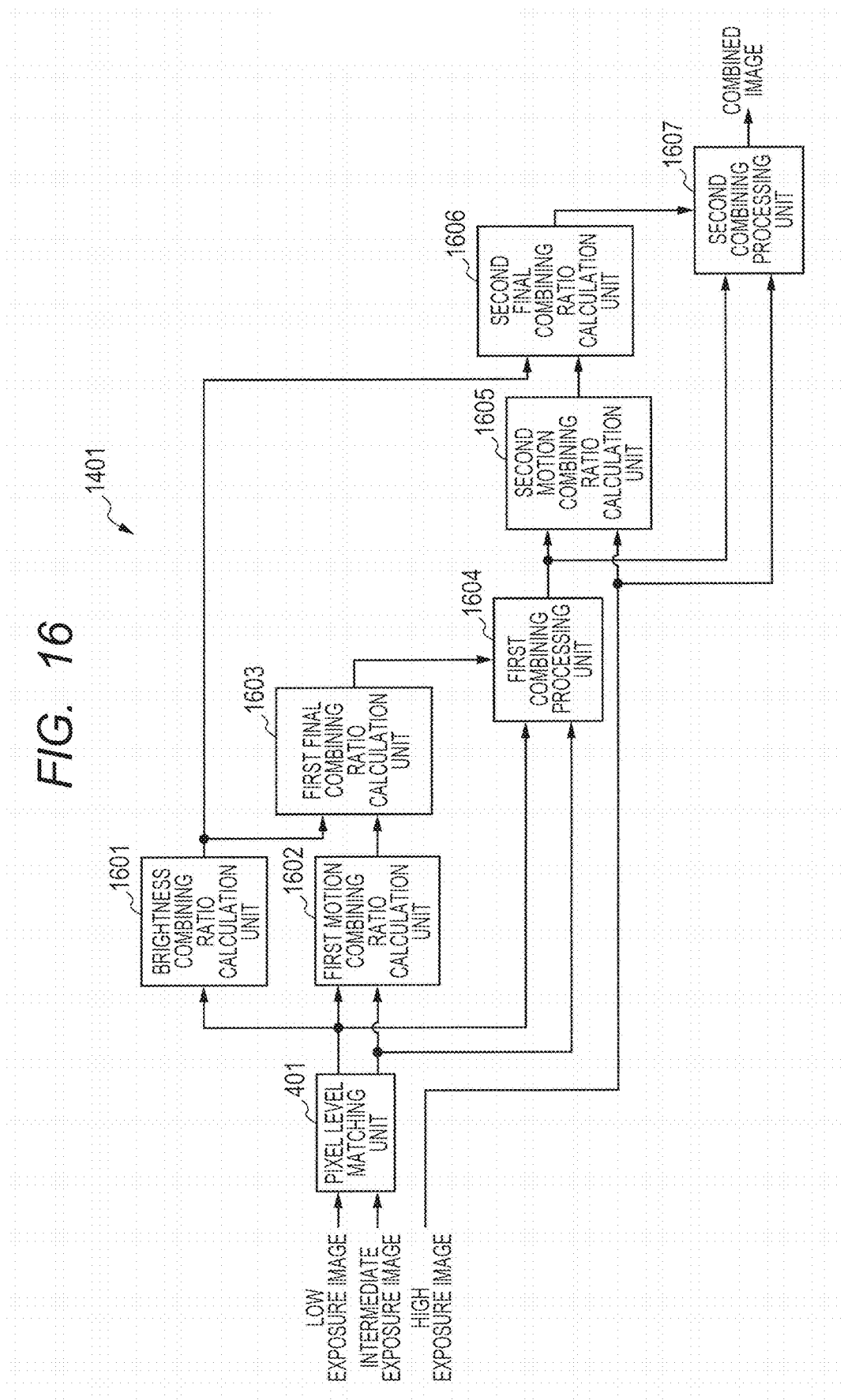
FIG. 16 is a block diagram for illustrating a detailed configuration example of a main image combining unit illustrated in FIG. 14.

FIG. 16 is a block diagram for illustrating a detailed configuration example of the main image combining unit 1401. As illustrated in FIG. 16, the main image combining unit 1401 includes the pixel level matching unit 401 as with the simple image combining unit 801. The main image combining unit 1401 further includes a brightness combining ratio calculation unit 1601, a first motion combining ratio calculation unit 1602, a first final combining ratio calculation unit 1603, a first combining processing unit 1604, a second motion combining ratio calculation unit 1605, a second final combining ratio calculation unit 1606, and a second combining processing unit 1607.

FIG. 17 is a flow chart for illustrating an example of a processing procedure by the main image combining unit 1401. Now, an operation of the main image combining unit 1401 is described in accordance with the flow chart of FIG. 17. Here, processing in Step S501 is similar to the processing illustrated in FIG. 5, and hence a description thereof is omitted.

Next in Step S1701, the brightness combining ratio calculation unit 1601 calculates the brightness combining ratio based on any one of the three images at the different exposures that have been matched in brightness. In this embodiment, an example in which the brightness combining ratio is calculated based on the low exposure image that has been matched in brightness is described. The brightness combining ratio calculation unit 1601 calculates brightness combining ratios for the images at the different exposures respectively with different calculation expressions as shown in FIG. 7 based on the luminance values in the low exposure image that has been matched in brightness. In other words, the brightness combining ratio is calculated for each pixel of the entire image region. This point is different from the processing of the brightness combining ratio calculation unit 402 of the simple image combining unit 801. The expressions for calculating the brightness combining ratios, which are shown in FIG. 7 are similar to those in the first embodiment, and hence a description thereof is omitted.

Next in Step S1702, the first motion combining ratio calculation unit 1602 receives the low exposure image and the intermediate exposure image, which have been matched in brightness, as inputs, and calculates the difference absolute values of the pixels between the images. Then, as shown in FIG. 13, the first motion combining ratio calculation unit 1602 calculates a first motion combining ratio for each pixel of the entire image region based on the difference absolute values of the pixels between the images. Note that, the expressions for calculating the motion combining ratios, which are shown in FIG. 13, are similar to those in the second embodiment, and hence a description thereof is omitted.

Subsequently, in Step S1703, the first final combining ratio calculation unit 1603 compares the brightness combining ratio and the first motion combining ratio for each pixel of the entire image region of the low exposure image. Then, the first final combining ratio calculation unit 1603 selects the combining ratio with the larger value, and outputs the combining ratio as a first final combining ratio for the low exposure image to the first combining processing unit 1604. Then, as the combining ratio of the intermediate exposure image, the first final combining ratio calculation unit 1603 selects the brightness combining ratio or the first motion combining ratio in accordance with the comparison result of the combining ratios of the low exposure image, and outputs the combining ratio as the first final combining ratio to the first combining processing unit 1604.

Next in Step S1704, the first combining processing unit 1604 takes the weighted sum of the entire low and intermediate exposure images in accordance with the first final combining ratios selected by the first final combining ratio calculation unit 1603 to generate a first combined image.

Next in Step S1705, the second motion combining ratio calculation unit 1605 receives the high exposure image and the first combined image obtained by the combining in the first combining processing unit 1604 as inputs, and calculates difference absolute values of pixels between the images. Then, as shown in FIG. 13, the second motion combining ratio calculation unit 1605 calculates a second motion combining ratio for each pixel of the entire image region based on the difference absolute values of the pixels between the images. The expressions for calculating the motion combining ratios, which are shown in FIG. 13, are similar to those in the second embodiment, and hence a description thereof is omitted.

Then, in Step S1706, the second final combining ratio calculation unit 1606 compares the brightness combining ratio and the second motion combining ratio calculated in Step 1705, for each pixel of the entire image region of the low exposure image. Then, the second final combining ratio calculation unit 1606 selects the combining ratio with the larger value, and outputs the combining ratio as a second final combining ratio for the first combined image to the second combining processing unit 1607. Then, as the combining ratio of the high exposure image, the second final combining ratio calculation unit 1606 selects the brightness combining ratio or the motion combining ratio in accordance with the comparison result of the combining ratios of the first combined image, and outputs the combining ratio as the second final combining ratio to the second combining processing unit 1607.

Then, in Step S1707, the second combining processing unit 1607 takes a weighted sum of the entire image regions of the first combined image and the high exposure image in accordance with the second final combining ratios calculated by the second final combining ratio calculation unit 1606 to generate a final combined image. As described above, according to this embodiment, the main combining processing is performed after the image capturing processing is finished, with the result that the combined image having the higher image quality may be obtained without missing the photo opportunity. In this embodiment, the example in which the three images at the different exposures are combined has been described, but in a case where four or more different images are combined, the images may be combined in multiple stages further including the third and fourth stages.

Note that, resolutions of the images used for the combining by the simple image combining unit 801 and the main image combining unit 1401 may be different from each other. In other words, the images used for the combining by the simple image combining unit 801 are images having a low resolution for display on the display unit 111, with the result that the amount of processing may be further reduced.

Moreover, in this embodiment, the configuration example in which the image pickup apparatus 1400 includes both the simple image combining unit 801 and the main image combining unit 1401 has been described, but the configuration is not limited thereto. For example, the image pickup apparatus 1400 may include only the simple image combining unit 801, and the main image combining unit 1401 may be included in an external image processing apparatus that is different from the image pickup apparatus 1400. In this case, the image pickup apparatus 1400 transfers the image data recorded in the recording medium 112 from a communication unit (not shown) to the external image processing apparatus, and the external image processing apparatus forms an image combining system for performing the main combining processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-116102, filed Jun. 4, 2014, which is hereby incorporated by reference herein in its entirety.

What is claimed is:

1. An image combining apparatus, comprising:
an image sensor that images a subject with different photographic conditions to generate a plurality of images; and
at least one processor that functions as:
a detecting unit configured to detect a region of interest including the subject from the plurality of images generated by the image sensor;
a calculation unit configured to calculate combining ratios for the plurality of images in the region of interest detected by the detecting unit;
a selection unit configured to select images having the combining ratios in the region of interest that are larger than a predetermined value for use in image combining from among the plurality of images; and
a combining unit configured to use the images selected by the selection unit to generate a combined image corresponding to regions including the region of interest and a region other than the region of interest, wherein
the combining unit comprises a first combining unit configured to generate the combined image for displaying, and a second combining unit configured to generate the combined image for recording,
the first combining unit is configured to determine the combining ratio based on the region of interest in the image, and generate the combined image by using only a part selected from the plurality of images generated by the image sensor according to the determined combining ratio, and
the second combining unit is configured to determine, for each pixel in the image, the combining ratio based on a pixel value of the pixel, and generate the combined image by using all of the plurality of images generated by the image sensor.

2. The image combining apparatus according to claim 1, wherein the image sensor generates the plurality of images with different exposures.

3. The image combining apparatus according to claim 1, wherein the calculation unit calculates the combining ratios based on brightnesses of the plurality of images.

4. The image combining apparatus according to claim 3, wherein the calculation unit further calculates the combining ratios based on a motion between the plurality of images.

5. The image combining apparatus according to claim 4, wherein the calculation unit calculates the combining ratios based on a motion between the images selected by the selection unit.

6. The image combining apparatus according to claim 4, wherein the first combining unit combines the images based on one of the combining ratios based on the brightnesses of the plurality of images and the combining ratios based on the motion between the plurality of images.

7. The image combining apparatus, according to claim 3, wherein the calculation unit calculates, as the combining ratios based on the brightnesses of the plurality of images, a combining ratio of an image at a low exposure to be higher as a luminance value in the region of interest becomes larger.

8. The image combining apparatus according to claim 4, wherein the calculation unit calculates, as the combining ratios based on the motion between the plurality of images, a combining ratio of an image at a low exposure to be higher as a difference absolute value of pixels becomes larger.

9. The image combining apparatus according to claim 1, wherein the. selection unit selects images having the combining ratios that are larger than 0%.

10. The image combining apparatus according to claim 9, wherein in a case where a number of the images having the combining ratios that are larger than 0% exceeds a predetermined number, the selection unit selects the predetermined number of images from among the images having the combining ratios that are larger than 0%.

11. The image combining apparatus according to claim 10, wherein the selection unit integrates the combining ratios based on brightnesses in the region of interest for each image, and selects the predetermined number of images in a decreasing order of the integrated values.

12. The image combining apparatus according to claim 10, wherein the selection unit selects the predetermined number of images in an increasing order of exposures.

13. The image combining apparatus according to claim 1, wherein the first combining unit combines the images based on the combining ratios in the region of interest, and uses one of the plurality of images as a substitute in the region other than the region of interest.

14. An image combining system, comprising;
an image sensor that images a subject with different photographic conditions to generate plurality of images; and
at least one processor that functions as:
a detecting unit configured to detect region of interest including the subject from the plurality of images generated by the image sensor;
a calculation unit configured to calculate combining ratios for the plurality of images in the region of interest detected by the detecting unit;
a selection unit configured to select images having the combining ratios in the region of interest that are larger than a predetermined value for use in image combining from among the plurality of images;
a first combining unit configured to use the images selected by the selection unit to generate a combined, image corresponding to regions including the region of interest and a region other than the region of interest;
a recording unit configured to record the plurality of images generated by the image sensor on a recording medium; and
a second combining unit configured to calculate, the combining ratios for entireties of the plurality of images recorded on the recording medium and combine the images,
wherein:
the first combining unit is configured to generate the combined image for displaying and the second combining unit is configured to generate the combined image for recording, the first combining unit configured to determine the combining ratio based on the region of interest in the image, and generate the combined image by using only a part selected from the plurality of images generated by the image sensor according the determined combined ratio, and the second combining unit is configured to determine, for each pixel in the image, the combining ratio based on a pixel value of the pixel, and generate the combined image by using all of the plurality of images generated by the image sensor.

15. An image combining method, comprising:

an imaging step of imaging a subject with different photographic conditions to generate a plurality of images;

a detecting step of detecting a region of interest including the subject from the plurality of images generated in the imaging step;

a calculation step of calculating combining ratios for the plurality of images in the region of interest detected in the detecting step;

a selection step of selecting images having the combining ratios in the region of interest that are larger than a predetermined value for use in image combining from among the plurality of images;

a first combining step of using the images selected in the selection step to generate a combined image corresponding to regions including the region of interest and a region other than the region of interest;

a recording step of recording the plurality of images generated in the imaging step on a recording medium; and a second combining step of calculating the combining ratios for entireties of the plurality of images recorded on the recording medium and combining the images, wherein:

the first combining step generates the combined image for displaying and the second combining step generates the combined image for recording, the first combining step determines the combining ratio based on the region of interest in the image, and generates the combined image by using only a part selected from plurality of ages generated in the imaging step according to the determined combined ratio, and the second combining step determines, for each pixel in the image, the combining ratio based on a pixel value of the pixel, and generates the combined image by using all of the plurality of images generated in the imaging step.

16. A non-transitory computer-readable recording medium having recorded thereon a program configured to cause a computer to execute:

an imaging step of imaging a subject with different photographic conditions to generate a plurality of images;

a detecting step of detecting a region, of interest including the subject from the plurality of images generated in the imaging step;

a calculation step of calculating combining ratios for the plurality of images in the region of interest detected in the detecting step;

a selection step of selecting images having the combining ratios in the region of interest that are larger than a predetermined value for use in image combining from among the plurality of images;

a first combining step of using the images selected in the selection step to generate a combined image corresponding to regions including the region of interest and a region other than the region of interest;

a recording step of recording the plurality of images generated in the imaging step on a recording medium; and a second combining step of calculating the combining ratios for entireties of the plurality of images recorded on the recording medium and combining the images, wherein:

the first combining step generates the combined image for displaying and the second combining step generates the combined image for recording, the first combining step determines the combining ratio based on the region of interest the image, and generates the combined image by using only a part selected from the plurality of images generated in the imaging step according to the determined combined ratio, and the second combining step determines, for each pixel in the image, the combining ratio based on a pixel value of the pixel, and generates the combined image by using all of the plurality of images generated in the imaging step.

17. The image combining apparatus according to claim 1, wherein the selection unit is configured to select images having the combining ratios in the region of interest that are larger than 0% for use by the first combining unit in image combining from among the plurality of images.

* * * * *